(12) United States Patent
Kim et al.

(10) Patent No.: US 9,101,032 B2
(45) Date of Patent: Aug. 4, 2015

(54) LED EMITTING DEVICE AND DRIVING METHOD THEREOF

(71) Applicant: Fairchild Korea Semiconductor Ltd., Bucheon (KR)

(72) Inventors: Jin-Tae Kim, Seoul (KR); Dong Jin Park, Bucheon (KR); Shanmei Li, Bucheon-si (KR); Byunghak Ahn, Seoul (KR); Jin Chenghao, Bucheon-si (KR)

(73) Assignee: Fairchild Korea Semiconductor LTD (KR)

( * ) Notice: Subject to any disclaimer, the term of this patent is extended or adjusted under 35 U.S.C. 154(b) by 0 days.

(21) Appl. No.: 13/845,932

(22) Filed: Mar. 18, 2013

(65) Prior Publication Data

US 2013/0249406 A1    Sep. 26, 2013

(30) Foreign Application Priority Data

Mar. 26, 2012  (KR) .................. 10-2012-0030806
Mar. 11, 2013  (KR) .................. 10-2013-0025815

(51) Int. Cl.
*H05B 33/08* (2006.01)

(52) U.S. Cl.
CPC .......... *H05B 33/0887* (2013.01); *H05B 33/089* (2013.01); *H05B 33/0815* (2013.01)

(58) Field of Classification Search
CPC ............... H05B 33/08; H05B 33/0803; H05B 33/0815; H05B 33/0818; H05B 33/0821; H05B 33/089; H05B 33/0824; H05B 33/0827; H05B 33/0887; H05B 37/02
USPC ......... 315/122, 193, 247, 276, 291, 294, 297, 315/307, 308
See application file for complete search history.

(56) References Cited

U.S. PATENT DOCUMENTS

| | | | |
|---|---|---|---|
| 6,353,523 B1 | 3/2002 | Niv et al. | |
| 8,471,483 B2 * | 6/2013 | Lee et al. | 315/192 |
| 2009/0295776 A1 * | 12/2009 | Yu et al. | 345/212 |
| 2012/0206433 A1 * | 8/2012 | Suzuki et al. | 345/212 |
| 2013/0127356 A1 * | 5/2013 | Tanaka et al. | 315/200 R |

* cited by examiner

*Primary Examiner* — Douglas W Owens
*Assistant Examiner* — Thai Pham
(74) *Attorney, Agent, or Firm* — Grossman Tucker; Perreault & Pfleger PLLC

(57) ABSTRACT

Disclosed are an LED emitting device and driving method thereof. The LED emitting device controls an LED drive switch connected to a first end of an LED string to control an output current supplied to the LED string. The LED emitting device generates feedback information on the output voltage or the output current supplied to the LED string, and uses the output current to sense an open lamp state of the LED string. The LED emitting device uses a voltage at a first end of the LED drive switch to sense a change of the LED string to a normal state from the open lamp state.

20 Claims, 9 Drawing Sheets

LED EMITTING DEVICE AND DRIVING METHOD THEREOF

CROSS-REFERENCE TO RELATED APPLICATION

This application claims priority to and of the benefit of Korean Patent Application No. 10-2012-0030806 filed in the Korean Intellectual Property Office on Mar. 26, 2012, and Korean Patent Application No. 10-2013-0025815 filed in the Korean Intellectual Property Office on Mar. 11, 2013, the entire contents of which are incorporated herein by reference.

BACKGROUND (a) Field

The present disclosure relates to an LED emitting device and a driving method thereof.

(b) Description of the Related Art

An AC-DC converter included in an LED emitting device converts an AC input into a DC voltage for emitting an LED. The LED emitting device includes a plurality of LEDs that are connected in series. Hereinafter, the LEDs connected in series will be called an LED string.

The DC voltage output by the AC-DC converter is supplied to the LED string, and in this instance, the DC voltage is controlled with a predetermined voltage that is greater than a forward voltage for the LED string to emit light. In this instance, the predetermined voltage is established to have an optimized level in consideration of power consumption.

While power is supplied to the LED string, an LED may be separated from the LED string, and the LED can be attached to the LED string in an open lamp state. Particularly, when the LED is attached to the LED string, a transient current that is greater than a rated current allowable for the LED string is generated so that the LED of the LED string may be damaged.

In detail, when a degraded LED is replaced with a new LED in the LED string, the degraded LED is separated from the LED string (i.e., to be in the open lamp state), and a new LED is attached to the LED string. In this instance, an output capacitor connected to an output terminal of the AC-DC converter can output a transient current that may damage at least some of the LEDs in the LED string.

Accordingly, the conventional emitting device generates the transient current after it is changed to the normal state from the open lamp state so it may damage the LED.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an LED emitting device for preventing damage to an LED caused by a transient current, and a driving method thereof.

An exemplary embodiment of the present disclosure provides a device for emitting an LED, including: an LED string including a plurality of LEDs; an LED drive switch including a first end connected to a first end of the LED string; an LED driver for controlling an output current that is supplied to the LED string by controlling the LED drive switch; and a constant current/constant voltage driver for generating feedback information on an output voltage supplied to the LED string or the output current, wherein the LED driver uses the output current to sense an open lamp state of the LED string, and uses a voltage at the first end of the LED drive switch to sense a change of the LED string to a normal state from the open lamp state.

The LED driver uses the output current to sense an open lamp state of the LED string, and uses a voltage at a first end of the LED drive switch to sense a change of the LED string to a normal state from the open lamp state.

The LED emitting device further includes a sense resistor connected between a second end of the LED drive switch and a ground, and the LED driver uses a sense voltage that is generated when the output current flows to the sense resistor to sense the open lamp state of the LED string.

The LED driver senses the open lamp state according to a result of comparing a detection voltage that is increased or decreased according to the sense voltage and an open sense voltage, and it senses a change to the normal state from the open lamp state according to a result of comparing a voltage at a first end of the LED drive switch and a normal reference voltage.

The LED driver includes: a first comparator for outputting the result of comparing the voltage at the first end of the LED drive switch and the normal reference voltage; a second comparator for outputting the result of comparing the detection voltage and the open sense voltage; a third comparator for outputting a result of comparing the detection voltage and a reference voltage that is greater than the open sense voltage; a first SR flip-flop for generating a first normal detection signal for indicating a normal state according to an output of the second comparator that is input to a set terminal, and generating a first open detection signal for indicating an open lamp state according to an output of the third comparator that is input to a reset terminal; a second SR flip-flop for generating a second normal detection signal for indicating a normal state according to an output of the first comparator that is input to a set terminal, and generating a second open detection signal according to the first open detection signal that is input to a reset terminal; a first logic gate for turning on the LED drive switch when at least one of the first normal detection signal and the second normal detection signal shows the normal state; and a second logic gate for outputting an open detection signal to the constant current/constant voltage driver when both the first open detection signal and the second open detection signal show the open lamp state.

The constant current/constant voltage driver generates feedback information following the output current so as to perform a constant current control on the output current in the normal state, and it generates feedback information following the output voltage so as to perform a constant voltage control on the output voltage in the open lamp state.

The constant current/constant voltage driver includes: a shunt regulator including a reference terminal, a grounded output terminal, and an input terminal for receiving the output voltage, the shunt regulator being turned on when a voltage that is input to the reference terminal is greater than a reference voltage; a photodiode connected between the input terminal of the shunt regulator and the output voltage; a first resistor connected between an anode of the photodiode and the output voltage; and a constant current/constant voltage controller using the sense voltage to control a current of photodiode so as to perform a constant current control in the normal state, and using the output voltage to generate a control voltage so as to perform a constant voltage control in the open lamp state.

The control voltage is input to the reference terminal of the shunt regulator.

The constant current/constant voltage controller receives an open detection signal for indicating the open lamp state from the LED driver, and controls the output voltage with a voltage that is less than a rated voltage during the open lamp state.

The constant current/constant voltage controller includes: a second resistor connected between a first end connected to the output voltage and the reference terminal of the shunt regulator; a capacitor and a third resistor connected in series between the reference terminal and the input terminal; a fourth resistor and a fifth resistor connected in series between the reference terminal and the ground; a switch connected in parallel to the fifth resistor, and turned on in the normal state and turned off in the open lamp state; and a BJT including a collector connected to the input terminal, a grounded emitter, and a base which the sense voltage is transmitted.

The switch performs a switching operation according to the open detection signal.

The LED driver rectifies the sense voltage to generate the detection voltage that is greater than the open sense voltage in the normal state.

The LED driver includes: a diode including an anode for receiving the sense voltage; a resistor including a first end connected to a cathode of the diode; and a capacitor including a first end connected to a second end of the resistor, and the detection voltage represents a voltage that is charged in the capacitor.

The LED driver senses the open lamp state according to a result of comparing a detection voltage that is increased or decreased according to the sense voltage and an open sense voltage, senses a change to the normal state from the open lamp state according to a result of comparing a voltage at a first end of the LED drive switch and a normal reference voltage, generates a soft reference voltage that is increased for a predetermined soft start period from a time when the change to the normal state is sensed, and controls the LED drive switch by using the soft reference voltage.

The LED driver includes: a first comparator for outputting the result of comparing the voltage at the first end of the LED drive switch and the normal reference voltage; a second comparator for outputting the result of comparing the detection voltage and the open sense voltage; a third comparator for outputting a result of comparing the detection voltage and a reference voltage that is greater than the open sense voltage; a first SR flip-flop for generating a first normal detection signal for indicating a normal state according to an output of the second comparator that is input to a set terminal, and generating a first open detection signal for indicating an open lamp state according to an output of the third comparator that is input to a reset terminal; a second SR flip-flop for generating a second normal detection signal for indicating a normal state according to an output of the first comparator that is input to a set terminal; a first logic gate for generating a gate control signal for controlling turn-on of the LED drive switch when at least one of the first normal detection signal and the second normal detection signal indicates the normal state; and a soft start controller for generating the soft reference voltage that is increased for the soft start period according to the gate control signal, and controlling the LED drive switch according to a result of comparing the detection voltage and the soft start reference voltage.

The soft start controller includes: a voltage source; a normal switch including a first end connected to the voltage source, and performing a switching operation according to the gate control signal; an open lamp switch for performing a switching operation according to the gate control signal; a capacitor connected in parallel to the open lamp switch; a resistor connected between the capacitor and a second end of the normal switch; and a comparator for controlling the LED drive switch according to a result of comparing a voltage at a node of the resistor and the capacitor and the detection voltage.

The voltage at the node of the resistor and the capacitor is the soft reference voltage.

Another embodiment of the present disclosure provides a method for driving an LED emitting device including an LED string for emitting light according to output current and a LED drive switch connected to the LED string, and generating an output voltage that is supplied to the LED string, including: sensing an open lamp state by sensing the output current; performing a constant voltage control on the output voltage in the open lamp state; turning on the LED drive switch when a voltage of the LED drive switch reaches a predetermined normal reference voltage; and performing a constant current control on the output current when the LED drive switch is turned on.

Another embodiment of the present disclosure provides a method for driving an LED emitting device including an LED string for emitting light according to output current and a LED drive switch connected to the LED string, and generating an output voltage that is supplied to the LED string, including: sensing an open lamp state by sensing the output current; performing a constant voltage control on the output voltage in the open lamp state; turning on the LED drive switch when a voltage of the LED drive switch reaches a predetermined normal reference voltage; and switching the LED drive switch according to a result of comparing a soft reference voltage that is increased for a predetermined soft start period from a time when the LED drive switch is turned on and a detection voltage following the output current.

According to the exemplary embodiments of the present disclosure, an LED emitting device for preventing damage of an LED caused by a transient current and a driving method thereof are provided.

DETAILED DESCRIPTION OF THE EMBODIMENTS

Figure 1:
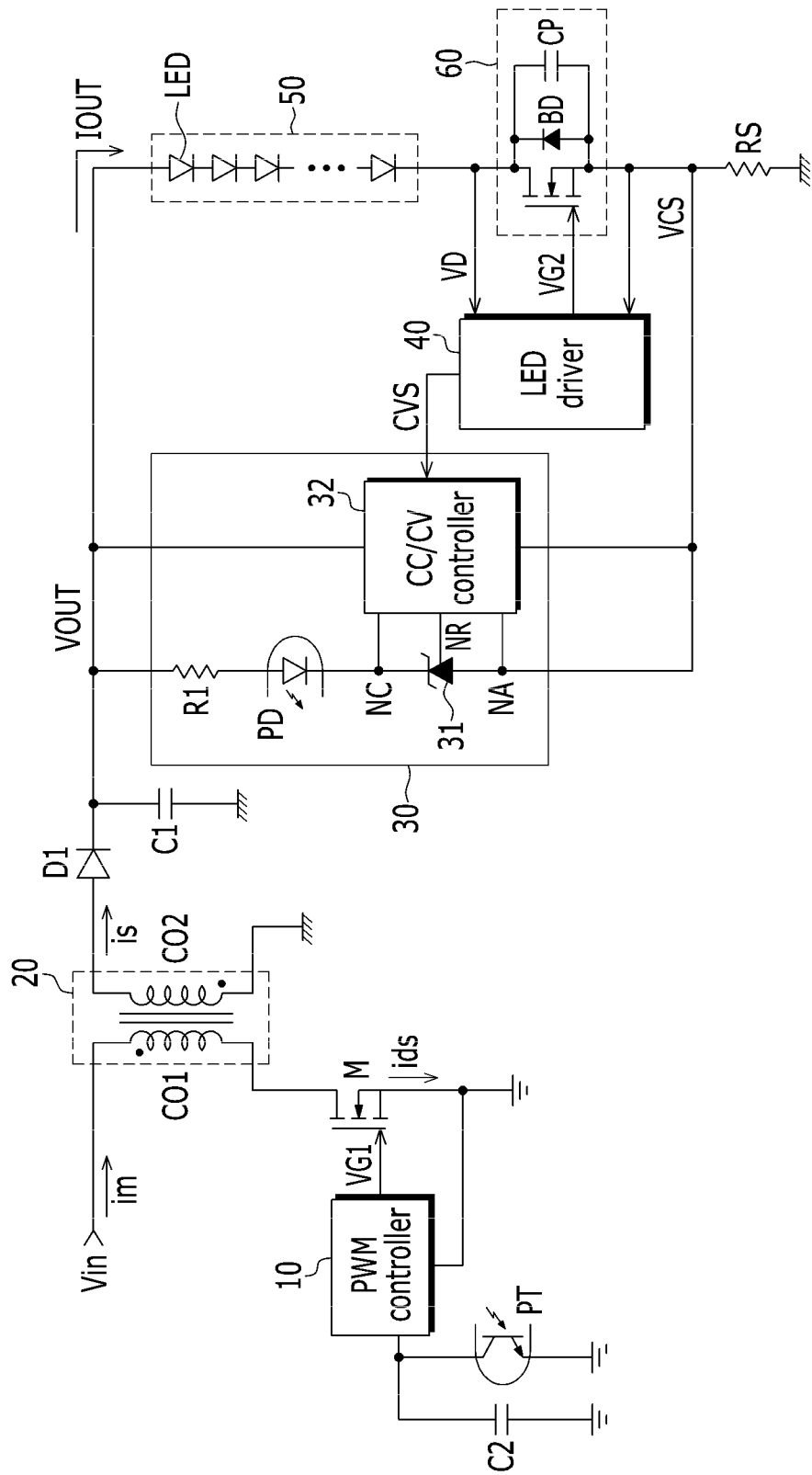
FIG. 1 shows an LED emitting device according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Exemplary embodiments of the present disclosure will now be described with reference to accompanying drawings.

FIG. 1 shows an LED emitting device according to an exemplary embodiment of the present disclosure.

As shown in FIG. 1, an LED emitting device 1 includes a power switch (M), a PWM controller 10, a transformer 20, a rectifying diode D1, a capacitor C1, a constant current/constant voltage (CC/CV) driver 30, an LED driver 40, an LED string 50, an LED drive switch 60, and a sense resistor (RS).

The transformer 20 includes a primary coil CO1 and a secondary coil CO2, and transmits primary power to a secondary coil side. The primary coil CO1 includes a first end for receiving an input voltage Vin and a second end connected to a drain electrode of the power switch (M). The second coil CO2 includes a first end connected to an anode of the rectifying diode D1 and a grounded second end.

The power switch (M) is provided on the primary coil side of the transformer 20, and is connected to the second end of the primary coil CO1 to control the transformer 20. Power on the secondary coil side is controlled by the transformer 20 so power transfer to the secondary coil side is controlled by the power switch (M).

The power switch (M) is switched by a gate signal VG1 output by the PWM controller 10. The power switch (M) is an n-channel type of transistor, it is turned on by a high-level gate signal VG1 and it is turned off by a low-level gate signal VG1.

The rectifying diode D1 includes an anode connected to a first end of the second coil CO2, and a cathode connected to the capacitor C1 and the LED string 50.

While the power switch (M) is turned on, a primary-side current (im) is increased and energy is stored in the primary coil C01. While the power switch (M) is turned on, the rectifying diode D1 is reversely biased to be turned off.

While the power switch (M) is turned off, the primary coil side current (im) is reduced, the rectifying diode D1 is turned on by a voltage generated to the second coil CO2, and the secondary coil side current (is) is passed through the rectifying diode D1 and is then transmitted to the LED string 50 and the capacitor C1.

The secondary coil side current (is), which is an output current (IOUT), is supplied to a load or charges the capacitor C1. The capacitor C1 attenuates a ripple of the output voltage (VOUT).

The CC/CV driver 30 generates feedback information following the output current (IOUT) and transmits it to the primary coil side so as to control a constant current (CC) in the normal state. In detail, the CC/CV driver 30 generates feedback information following the output current (IOUT) by using a sense voltage (VCS) following the output current (IOUT) in the normal state.

The CC/CV driver 30 generates feedback information following the output voltage (VOUT), and transmits it to the primary coil side so as to control the constant voltage (CV) in the open lamp state. In this instance, the output voltage (VOUT) can be CV controlled with a voltage that is less than a rated voltage. The rated voltage represents a voltage for driving the LED string 50 with a constant current.

The CC/CV driver 30 includes a resistor R1, a photodiode (PD), a shunt regulator 31, and a CC/CV controller 32. The resistor R1 includes a first end connected to the output voltage (VOUT) and a second end connected to a photodiode (PD).

The photodiode (PD) forms an opto-coupler together with a phototransistor (PT) on the primary coil side. The photodiode (PD) is connected to the output voltage (VOUT) through the resistor R1.

The shunt regulator 31 is a three-terminal element, it includes an output terminal (NA), an input terminal (NC), and a reference terminal (NR), and when a voltage at the reference terminal (NR) is greater than the reference voltage, a gap between the input terminal (NC) and the output terminal (NA) is turned on and a current flows according to a difference between the voltage at the input terminal (NC) and the reference voltage. The output terminal (NA) is grounded, the input terminal (NC) is connected to a cathode of the photodiode (PD), and the reference terminal (NR) receives a voltage from the CC/CV controller 32.

The CC/CV controller 32 generates a control current ICC by using a sense voltage (VCS) so as to perform a CC control in the normal state, and it generates a control voltage (VC) by using the output voltage (VOUT) so as to perform constant voltage control in the open lamp state. The control voltage (VC) is input to the reference terminal (NR).

When the open detection signal (CVS) shows the open lamp state, the CC/CV controller 32 generates a control voltage (VC) so that the output voltage (VOUT) may be maintained at a voltage that is less than the rated voltage according to the open detection signal (CVS).

The LED string 50 receives the output voltage (VOUT) and emits light according to a drive current that flows by a switching operation of the LED driver 40. The LED string 50 includes a plurality of light emitting diodes (LEDs) that are connected in series, and the LED string 50 is connected between a first end of the capacitor C1 and the LED drive switch 60.

The LED drive switch 60 controls the current flowing to the LED string 50. A body diode BD and a parasitic capacitor CP are formed between a drain electrode and a source electrode of the LED drive switch 60. The LED drive switch 60 is realized with an n channel transistor, but the present disclosure is not limited thereto.

The LED drive switch 60 includes a drain electrode connected to the LED string 50, a source electrode connected to a first end of the sense resistor (RS), and a gate electrode for receiving a gate signal (VG) from the LED driver 40.

The sense resistor (RS) is connected between a source electrode of the LED drive switch 60 and a ground. The sense voltage (VCS) is generated when the output current (IOUT) transmitted through the LED drive switch 60 flows to the sense resistor (RS).

The LED driver 40 uses the output current (IOUT) to sense the open lamp state, it uses the voltage input to the LED drive switch 60 to sense that the state is changed to the normal state from the open lamp state, and it controls the LED drive switch 60 according to the sensed state.

The LED driver 40 uses the sense voltage (VCS) to sense the output current (IOUT), and it senses a drain voltage (VD) of the LED drive switch 60.

In detail, the output current (IOUT) is generated while the power switch (M) is turned off. When the power switch (M) is turned on, the rectifying diode D1 is turned off so the output current (IOUT) is not generated. Therefore, the sense voltage (VCS) is generated when the power switch (M) is turned off in a like manner of the output current (IOUT).

However, when the sense voltage (VCS) is used so as to sense the open lamp state, a period in which the sense voltage (VCS) is not generated, that is, the period in which the power switch (M) is turned on, can be determined to be in the open lamp state. The LED driver 40 can add a predetermined delay period to the sense voltage (VCS) so as to determine the above-noted period to be in the open lamp state when the input sense voltage (VCS) is not generated for a predetermined time.

In addition, the LED driver 40 rectifies the sense voltage (VCS) to maintain it with at least a predetermined voltage. A voltage that is generated by delaying or rectifying the sense voltage (VCS) will be referred to as a detection voltage (VDE).

The exemplary embodiment of the present disclosure is not restricted to the above description, and the exemplary embodiment of the present disclosure can generate a detection voltage (VDE) that is increased or decreased by the sense voltage (VCS) and has a voltage that is greater than the open sense voltage while the power switch (M) is turned on.

The LED driver 40 senses the open lamp state according to a result of comparing the open reference voltage and the detection voltage (VDE). The output current (IOUT) does not flow in the open lamp state, and the sense voltage (VCS) is a zero voltage so the detection voltage (VDE) also becomes the zero voltage. The LED driver 40 can determine it to be the open lamp state when the detection voltage (VDE) is less than the open reference voltage.

When the open lamp state is generated, the LED driver 40 generates an open detection signal (CVS) for instructing a CV control and transmits the same to the CC/CV controller 32 of the CC/CV driver 30.

When the LED string 50 is in the open lamp state, the drain voltage (VD) is the zero voltage. The LED drive switch 60 is turned on in the normal state so the drain voltage (VD) represents a sum of the sense voltage (VCS) and a drain-source voltage of the turned-on LED drive switch 60.

When it is changed to the normal state from the open lamp state, a parasitic capacitor (CP) of the turned-off LED drive switch 60 is charged by the output current (IOUT). The drain voltage (VD) begins to be increased, and the LED driver 40 senses the changing to the normal state according to a result of comparing the normal reference voltage and the drain voltage (VD).

In detail, when the LED string 50 is changed to the normal state, the output current (IOUT) flows to the LED string 50, and the parasitic capacitor (CP) is charged by the output current (IOUT). Therefore, the drain voltage (VD) is increased to reach the normal reference voltage. In this instance, the LED driver 40 senses the changing to the normal state, and generates a high-level gate signal VG2 for turning on the LED drive switch 60.

The LED driver 40 senses the normal state according to the result of comparing the detection voltage (VDE) and the third threshold voltage, and maintains the gate signal VG2 at the high level.

A current following a light emission amount of a photodiode (PD) flows to a phototransistor (PT) forming an optocoupler with a photodiode (PD). A capacitor C2 is connected in parallel to the phototransistor (PT). The voltage at the capacitor C2 is determined by the current flowing to the phototransistor (PT), and the voltage charged in the capacitor C2 becomes a feedback voltage (VF) according to feedback information transmitted by the secondary coil side.

In detail, when the shunt regulator 31 is turned on to flow the current and the photodiode (PD) emits light, the current flows to the phototransistor (PT). The current supplied to the capacitor C2 from the PWM controller 10 is reduced and the feedback voltage (VF) is reduced.

On the contrary, when the shunt regulator 31 is blocked, no current flows, and the photodiode (PD) does not emit light, so no current flows to the phototransistor (PT). The current that is supplied to the capacitor C2 from the PWM controller 10 is reduced and the feedback voltage (VF) is increased.

The PWM controller 10 uses the drain current (Ids) and the feedback voltage (VF) flowing to the power switch (M) to control the power switch (M). The PWM controller 10 turns on the power switch (M) according to clock signals for controlling a switching frequency, and it turns off the power switch (M) when the drain current (Ids) reaches the feedback voltage (VF).

Therefore, as the feedback voltage (VF) is reduced, a duty of the power switch (M) is reduced to decrease energy transmitted to the secondary coil side, and as the feedback voltage (VF) is increased, the duty of the power switch (M) is increased to increase the energy transmitted to the secondary coil side.

A CC/CV driver 30 and an LED driver 40 according to an exemplary embodiment of the present disclosure will now be described with reference to FIGS. 2 and 3.

Figure 2:
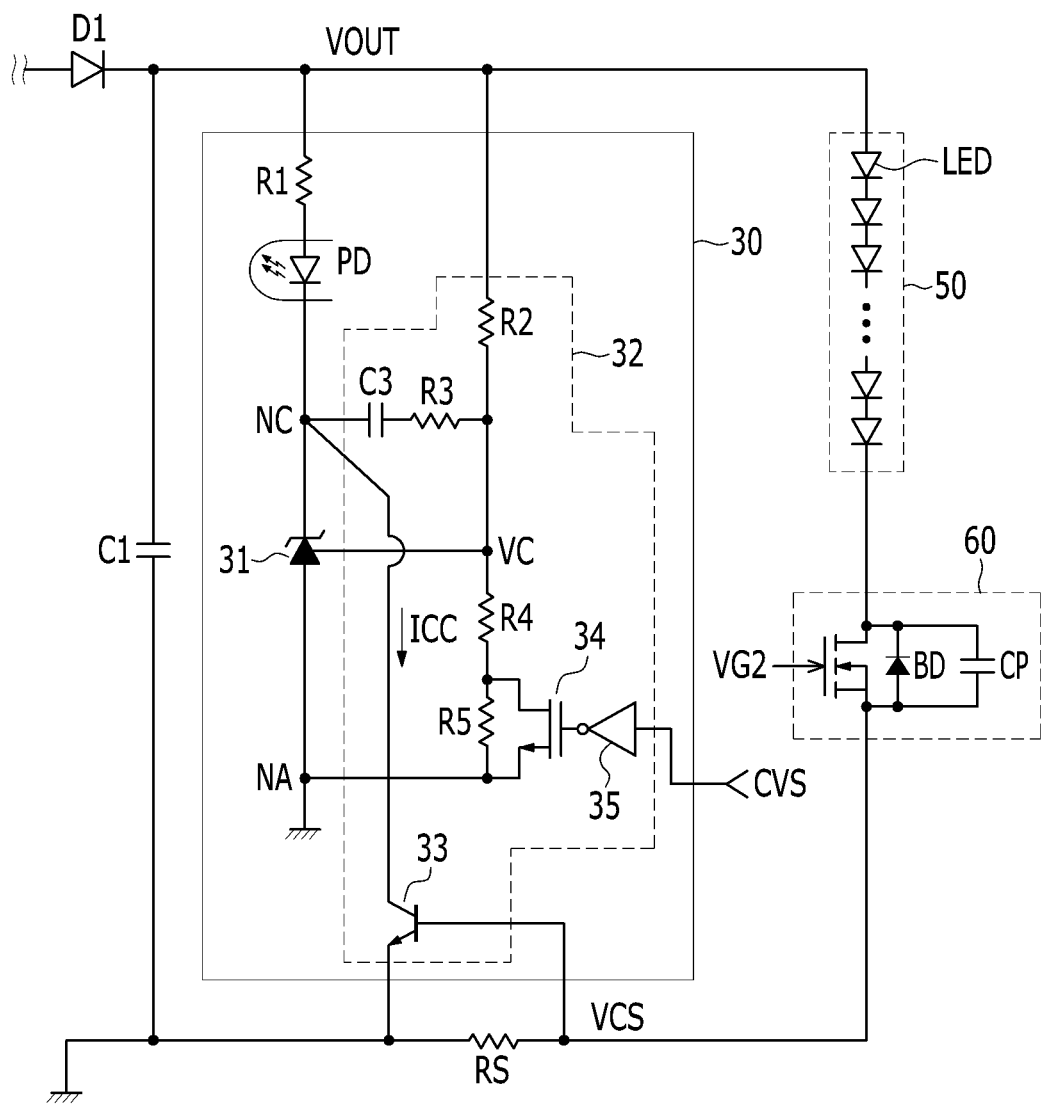
FIG. 2 shows a CC/CV driver according to an exemplary embodiment of the present disclosure.

FIG. 2 shows a CC/CV driver according to an exemplary embodiment of the present disclosure.

As shown in FIG. 2, the CC/CV driver 30 includes a CC/CV controller 32 that is connected to a reference terminal and an input terminal of a shunt regulator 31, and a ground, and that receives an output voltage (VOUT), a sense voltage (VCS), and an open detection signal (CVS).

The CC/CV controller 32 operates the shunt regulator 31 according to the sense voltage (VCS) so as to perform a CC control, and operates the shunt regulator 31 according to the output voltage (VOUT) so as to perform a CV control. In the open lamp state, the output voltage (VOUT) for turning on the shunt regulator 31 is reduced by the open detection signal (CVS).

The CC/CV controller 32 includes resistors (R2-R5), a capacitor C3, a BJT 33, a MOSFET 34, and an inverter 35. The resistor R2, the resistor R4, and the resistor R5 are connected in series between the output voltage (VOUT) and the ground. A node of the resistor R4 and the resistor R2 is connected to the reference terminal (NR) of the shunt regulator 31. A node voltage of the resistor R4 and the resistor R2 represents the control voltage (VC).

The MOSFET 34 is connected in parallel to the resistor R5. The MOSFET 34 is turned on in the normal state and is turned off in the open lamp state. When the MOSFET 34 is turned on in the normal state, a voltage (VOUT*R4/(R2+R4)) generated by dividing the output voltage (VOUT) by the resistor R2 and the resistor R4 becomes the control voltage (VC). When the MOSFET 34 is turned off in the open lamp state, a voltage (VOUT*(R4+R5)/(R2+R4+R5)) generated by dividing the output voltage (VOUT) by the resistor R2, the resistor R4, and the resistor R5 becomes the control voltage (VC).

The control voltage (VC) of the open lamp state is set to be greater than that of the normal state. The shunt regulator 31 is turned on by a low output voltage (VOUT) in the open lamp state, compared to the normal state. When the shunt regulator 31 is turned on, the current flows through the photodiode (PD) and the photodiode (PD) emits light. Therefore, the current flows to the phototransistor (PT) and the feedback voltage (VF) is reduced. A duty of the power switch (M) is reduced and the output voltage (VOUT) is reduced.

When the output voltage (VOUT) is reduced, the control voltage (VC) is reduced to block the shunt regulator 31. The feedback voltage (VF) is then increased to increase the duty of the power switch (M) and also increase the output voltage (VOUT). According to the above-noted method, the output voltage (VOUT) is controlled to be constant. That is, the MOSFET 34 reduces the output voltage (VOUT) for turning on the shunt regulator 31.

The MOSFET 34 must be turned off when the open detection signal (CVS) has a high level, an enable level, and the MOSFET 34 must be turned on when it has a low level, a disable level.

The MOSFET 34 is the n-channel type so the open detection signal (CVS) is inverted by the inverter 35 and the inverted signal is input to the gate electrode of the MOSFET 34. However, FIG. 2 shows an example for describing the exemplary embodiment of the present disclosure, and the present disclosure is not limited thereto.

For example, the connection among the resistor R4, the resistor R5, and the MOSFET 34 is changeable within a range satisfying a condition in which the control voltage (VC) in the open lamp state is greater than the control voltage (VC) in the normal state when the output voltages are equivalent.

Further, the enable level of the open detection signal (CVS) can be the low level, and the disable level can be the high level. In addition, the MOSFET 34 can be the p-channel type. In this case, the CC/CV controller 32 does not include the inverter 35.

The capacitor C3 and the resistor R3 connected between the input terminal and the output terminal of the shunt regulator 31 are considered when a gain of the shunt regulator 31 is determined. The gain of the shunt regulator 32 represents a ratio of a voltage change at the input terminal (NC) vs. a voltage change at the output terminal (NA).

The BJT 33 controls the current of the photodiode (PD) according to the sense voltage (VCS) so as to perform a CC control. The BJT 33 includes a collector connected to the input terminal (NC), a base for receiving the sense voltage (VCS), and a grounded emitter, and a sense resistor (RS) is connected between the base and the emitter.

As the sense voltage (VCS) is increased, the control current ICC flowing to the BJT 33 is increased, and then the shunt regulator 31 is turned on.

The current flows through the photodiode (PD) and the photodiode (PD) emits light. Therefore, the current flows to the phototransistor (PT) and the feedback voltage (VF) is decreased. The duty of the power switch (M) is reduced so energy transmitted to the secondary coil side is reduced and the output current (IOUT) is reduced.

When the output current (IOUT) is reduced, the sense voltage (VCS) is reduced and the control current ICC flowing to the BJT 33 is reduced.

Therefore, the feedback voltage (VF) is increased and the duty of the power switch (M) is increased. The energy transmitted to the secondary coil side is increased and the output current (IOUT) is increased. According to the above-noted method, the output current (IOUT) is controlled to be constant.

An LED driver 40 according to an exemplary embodiment of the present disclosure will now be described with reference to FIG. 3.

Figure 3:
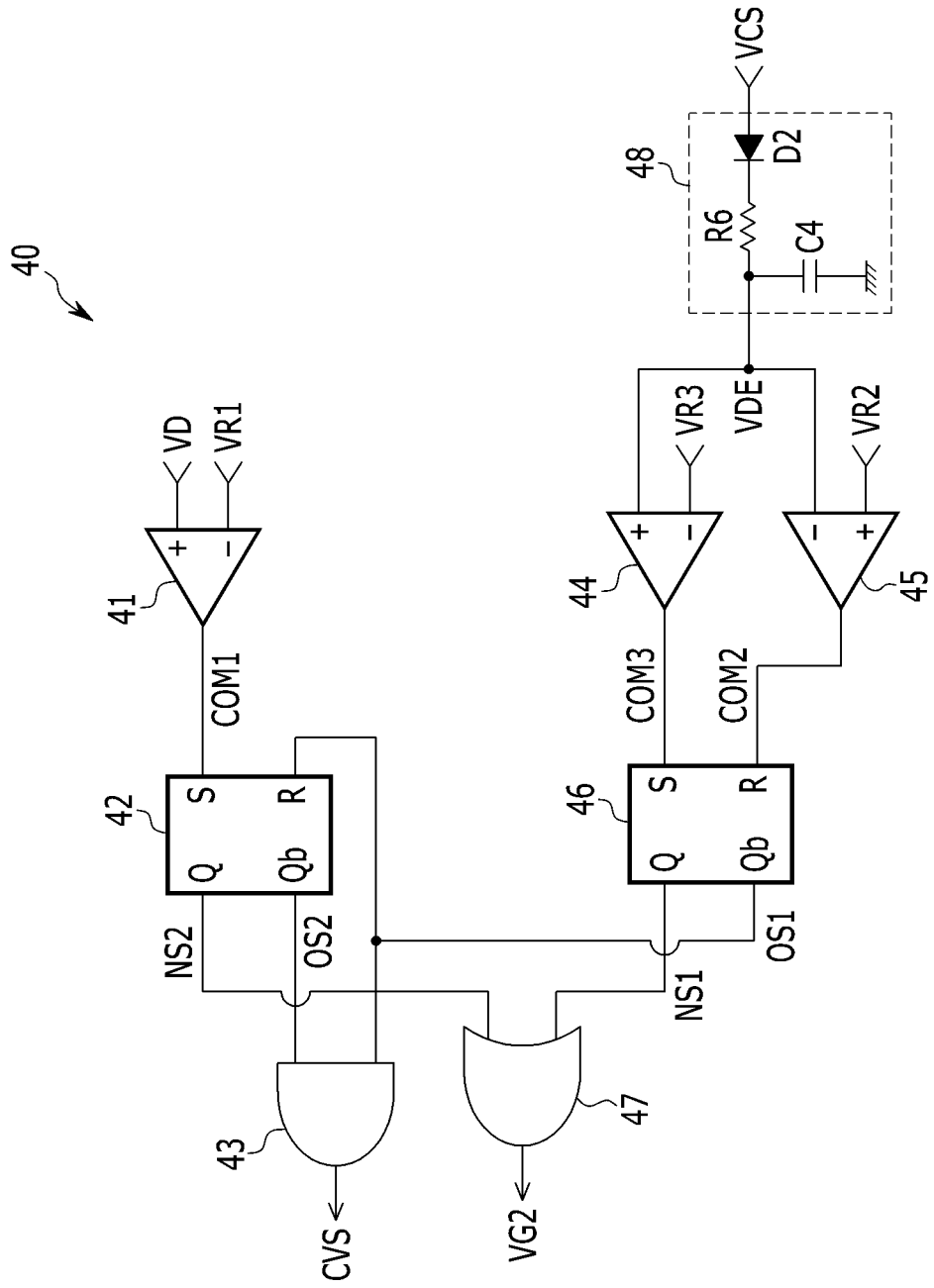
FIG. 3 shows an LED driver according to an exemplary embodiment of the present disclosure.

FIG. 3 shows an LED driver according to an exemplary embodiment of the present disclosure.

The LED driver 40 includes three comparators 41, 44, and 45, two SR flip-flops 42 and 46, an OR gate 47, an AND gate 43, and a rectifying circuit 48. The rectifying circuit 48 is used to generate the detection voltage (VDE) in FIG. 3, but the present disclosure is not restricted thereto and a delay circuit can be used to generate the detection voltage (VDE).

The rectifying circuit 48 includes a diode D2, a resistor R6, and a capacitor C4. The diode D2 includes an anode for receiving the sense voltage (VCS) and a cathode connected to a first end of the resistor R6. A second end of the resistor R6 is connected to a first end of the capacitor C4, and a second end of the capacitor C4 is grounded.

When the sense voltage (VCS) is generated and the diode D2 is turned on, the current flowing to the resistor R6 charges the capacitor C4. The voltage at the first end of the capacitor C4 represents the detection voltage (VDE).

The comparator 41 compares the drain voltage (VD) and the normal reference voltage VR1, and generates a comparison signal COM1 according to the comparison result. A normal reference voltage VR1 is input to an inverting terminal (−) of the comparator 41, and a drain voltage (VD) is input to a non-inverting terminal (+) of the comparator 41.

The comparator 45 compares the detection voltage (VDE) and the open reference voltage VR2, and generates a comparison signal COM2 according to the comparison result. An open reference voltage VR2 is input to a non-inverting terminal (+) of the comparator 45, and the detection voltage (VDE) is input to an inverting terminal (−) of the comparator 45.

The comparator 44 compares the detection voltage (VDE) and the third threshold voltage VR3, and generates a comparison signal COM3 according to the comparison result. A third threshold voltage VR3 is input to an inverting terminal (−) of the comparator 44, and the detection voltage (VDE) is input to a non-inverting terminal (+) of the comparator 44.

The third threshold voltage VR3 is greater than the open reference voltage VR2. The normal reference voltage VR1 represents a voltage for sensing a time when the open lamp state is finished and is changed to the normal state. That is, it can be set to be a voltage that is generated when the parasitic capacitor (CP) is charged by the output current (IOUT) for a predetermined period from the changing time.

The open reference voltage VR2 is used to sense the open lamp state. That is, it can be set to be the zero voltage so as to sense that the detection voltage (VDE) becomes the zero voltage.

The comparators 41, 44, and 45 generate high-level comparison signals COM1, COM2, and COM3 when inputs to the non-inverting terminal (+) are greater than inputs to the inverting terminal (−), and they generate low-level comparison signals COM1, COM2, and COM3 when the inputs to the non-inverting terminal (+) are less than the inputs to the inverting terminal (−).

The SR flip-flop 46 includes a reset terminal (R) for receiving the comparison signal COM2, a set terminal (S) for receiving the comparison signal COM3, an output terminal (Q), and an inverting output terminal (Qb).

The SR flip-flop 42 includes a set terminal (S) for receiving the comparison signal COM1, a reset terminal (R) connected to an inverting output terminal (Qb) of the SR flip-flop 46, an output terminal (Q), and an inverting output terminal (Qb).

The SR flip-flops 42 and 46 output high-level signals through the output terminals (Q) when the set terminal (S) receives a high-level input and the reset terminal (R) receives a low-level input, and they output low-level signals through the inverting output terminals (Qb). The SR flip-flops 42 and 46 output low-level signals through the output terminals (Q) when the set terminal (S) receives a low-level input and the reset terminal (R) receives a high-level input, and they output high-level signals through the inverting output terminals (Qb).

A signal that is output through the output terminal (Q) of the SR flip-flop 46 will be called a first normal detection signal NS1, a signal that is output through the inverting output terminal (Qb) of the SR flip-flop 46 will be called a first open detection signal OS1, a signal that is output through the output terminal (Q) of the SR flip-flop 42 will be called a second normal detection signal NS2, and a signal that is output through the inverting output terminal (Qb) of the SR flip-flop 42 will be called a second open detection signal OS2.

The AND gate 43 performs a logical AND operation on the first open detection signal OS1 and the second open detection signal OS2 to generate an open detection signal (CVS). The AND gate 43 generates a high-level open detection signal (CVS) when both inputs are high, and it generates a low-level open detection signal (CVS) when both the inputs are not high.

The OR gate 47 performs a logical OR operation on the first normal detection signal NS1 and the second open detection signal NS2 to generate a gate signal VG2. The OR gate 47 generates a high-level gate signal VG2 when one of the two inputs is high.

An LED driver and a CC/CV driver according to an exemplary embodiment of the present disclosure will now be described with reference to FIGS. 4 and 5.

Figure 4:
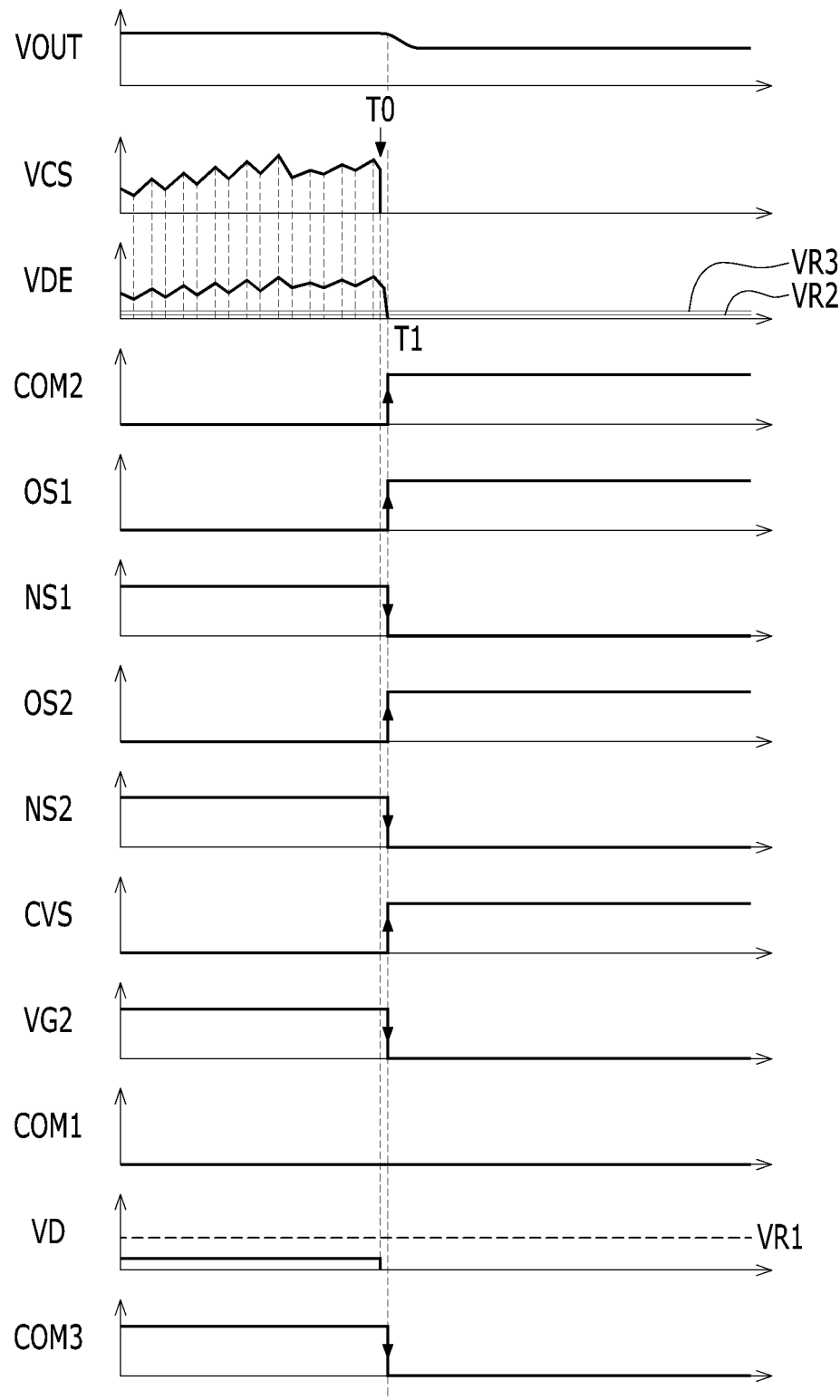
FIG. 4 shows a waveform diagram of signals of a CC/CV driver and an LED driver when a state is changed to an open lamp state from a normal state.

FIG. 4 shows a waveform diagram of signals of a CC/CV driver and an LED driver when a state is changed to an open lamp state from a normal state.

The LED drive switch 60 is turned on in the normal state so the drain voltage (VD) has a low voltage. Therefore, the drain voltage (VD) is less than the normal reference voltage VR1, and the comparison signal COM1 has the low level. For reference, in FIG. 4, a vertical axis scale of a coordinate where the VD voltage is shows is much greater than a vertical axis scale of a coordinate where the sense voltage VCS is shown.

As shown in FIG. 4, in the normal state, the sense voltage (VCS) has a waveform in which it is increased while the power switch (M) is turned off and it is reduced while the power switch (M) is turned on. That is, the sense voltage (VCS) has a waveform in which the sense voltage (VCS) has a DC ripple component by the capacitor C1 with respect to a predetermined value. The detection voltage (VDE) has a waveform in which the DC ripple component of the sense voltage (VCS) is further weakened.

The detection voltage (VDE) is greater than the third threshold voltage VR3, so the comparison signal COM3 is high and the comparison signal COM2 is low.

The SR flip-flop 46 generates a high-level first normal detection signal NS1 and a low-level first open detection signal OS1, and the SR flip-flop 42 generates a low-level second normal detection signal NS2 and a low-level second open detection signal OS2.

The AND gate 42 generates a low-level open detection signal (CVS) and the OR gate 47 generates a high-level gate signal VG2. In the exemplary embodiment of the present disclosure, the high-level open detection signal (CVS) indicates the open lamp state.

In order to describe the operation in the open lamp state, it is assumed that the open lamp state is generated at the time T0. At the time T0, the sense voltage (VCS) becomes the zero voltage, and the drain voltage (VD) becomes the zero voltage. As shown in FIG. 4, at the time T1, the detection voltage (VDE) becomes the zero voltage, the comparison signal COM3 becomes low, and the comparison signal COM2 becomes high.

The SR flip-flop 46 generates a low-level first normal detection signal NS1 and a high-level first open detection signal OS1. The SR flip-flop 42 generates a low-level second normal detection signal NS2 and a high-level second open detection signal OS2 according to the high-level first open detection signal OS1.

The AND gate 42 generates a high-level open detection signal (CVS), and the OR gate 47 generates a low-level gate signal VG2. The drain voltage (VD) is maintained at the zero voltage when the LED drive switch 60 is turned off in the open lamp state.

By the high-level open detection signal (CVS), the CC/CV driver 30 starts a CV control, and the MOSFET 34 of the CC/CV controller 32 is turned off to increase the control voltage (VC).

That is, the shunt regulator 31 is turned on with the output voltage (VOUT) that is lower in the open lamp state than in the normal state. As shown in FIG. 4, the output voltage (VOUT) becomes less than the normal state after the time T1.

Figure 5:
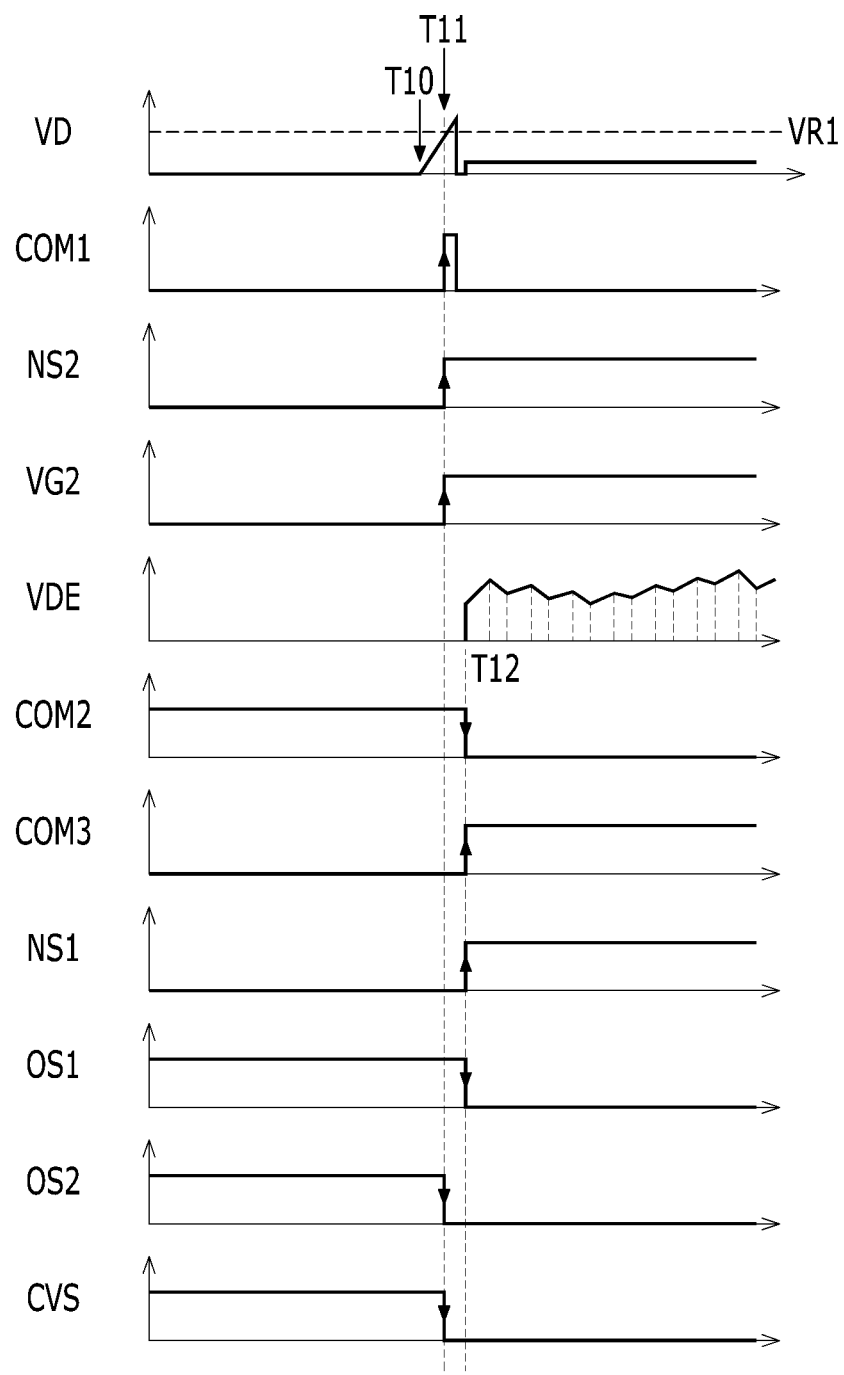
FIG. 5 shows a waveform diagram of signals of a CC/CV driver and an LED driver when a state is changed to a normal state from an open lamp state.

FIG. 5 shows a waveform diagram of signals of a CC/CV driver and an LED driver when a state is changed to a normal state from an open lamp state.

At the time T10, when the state is changed to the normal state from the open lamp state, the output current (IOUT) starts to flow, and the drain voltage (VD) starts to rise by the output current (IOUT). The comparison signal COM1 rises in synchronization with the time T11 when the rising drain voltage (VD) reaches the normal reference voltage VR1.

The comparison signal COM1 becomes high so the SR flip-flop 42 generates a high-level second normal detection signal NS2 and a low-level second open detection signal OS2. In this instance, the second normal detection signal NS2 becomes high so the gate signal VG2 becomes high, and the second open detection signal OS2 becomes low so the open detection signal (CVS) becomes low.

At the time T11, the LED drive switch 60 is turned on, and at the time T12, a detection voltage (VDE) is generated. When the detection voltage (VDE) is generated, the comparison signal COM2 becomes low and the comparison signal COM3 becomes high. The SR flip-flop 46 generates a high-level first normal detection signal NS1 and a low-level first open detection signal OS1.

A sense voltage (VCS) is generated by the power switch (M) on the primary coil side. This is shown with a dotted line together with the detection voltage (VDE) in FIG. 5. At the time T11 when the LED drive switch 60 is turned on, the output voltage (VOUT) is lower than the rated voltage. As shown in FIG. 4, the output voltage (VOUT) in the open lamp state is maintained at a voltage that is less than the rated voltage. Therefore, an inrush current of the output current (IOUT) is not generated because of the low output voltage (VOUT) at the time when it is in the normal state.

In the case in which the output voltage is controlled by overvoltage regulation in the open lamp state in a like manner of the conventional LED emitting device, when the LED element is connected to the LED string and it comes to be in the normal state, the inrush current of the output current is generated by the high output voltage.

However, in the exemplary embodiment of the present disclosure, the output voltage is controlled to be the low voltage in the open lamp state, so the inrush current of the output current (IOUT) is not generated when it is changed to the normal state from the open lamp state. The effect according to the exemplary embodiment of the present disclosure is equivalent to the effect that is acquired through a soft-start operation. That is, the inrush current that is generated when it is changed to the normal state can be prevented by CV controlling the output voltage (VOUT) with the voltage that is less than the rated voltage in the open lamp state.

An LED driver and a CC/CV driver according to another exemplary embodiment of the present disclosure will now be described.

Figure 6:
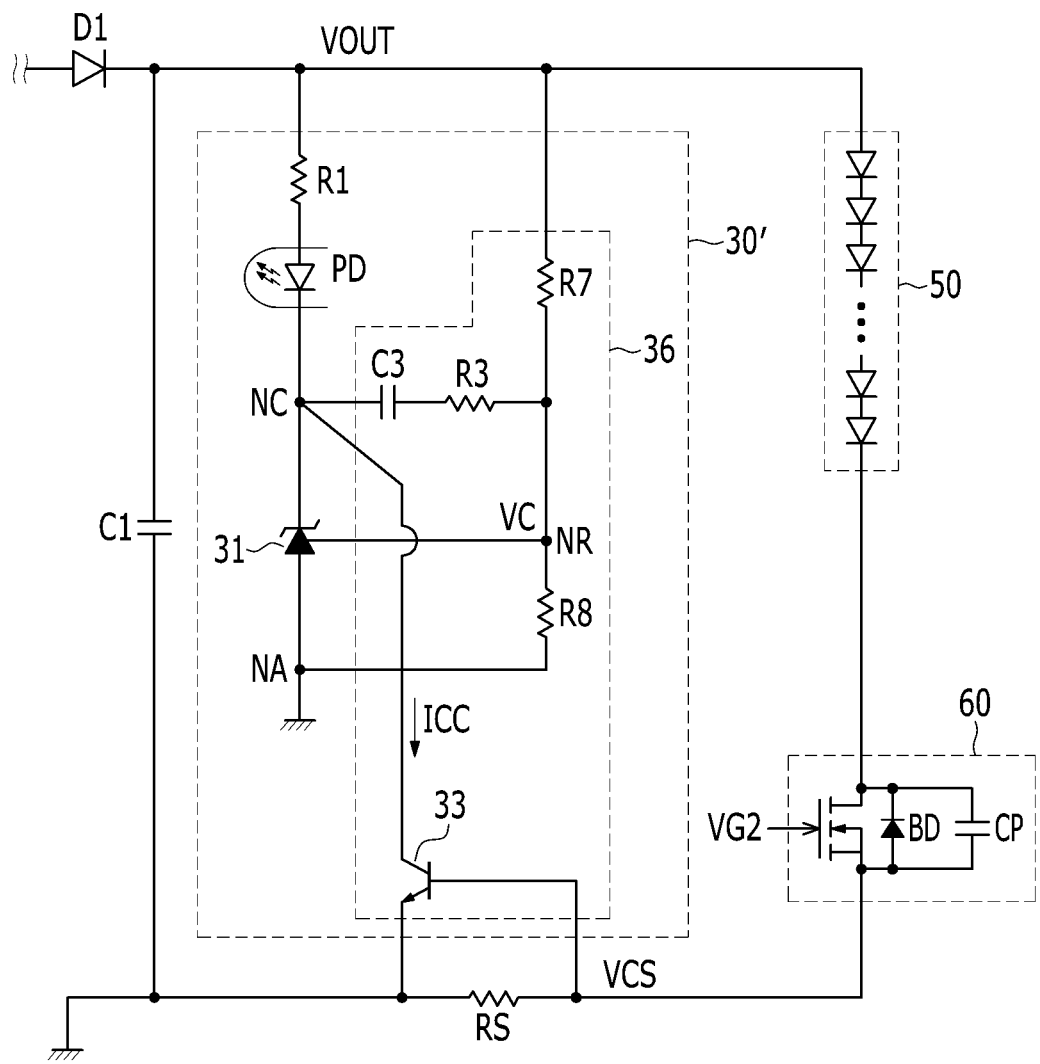
FIG. 6 shows a CC/CV driver according to another exemplary embodiment of the present disclosure.

FIG. 6 shows a CC/CV driver according to another exemplary embodiment of the present disclosure. A CC/CV controller 36 of the CC/CV driver 30' shown in FIG. 6 is different from the CC/CV controller 32 shown in FIG. 2, and other components are equivalent.

The CC/CV controller 36, differing from the CC/CV controller 32, omits the configuration for controlling the output voltage for turning on the shunt regulator 31 according to the open detection signal (CVS) with the voltage that is lower than the rated voltage, which is because an LED driver 40' according to another exemplary embodiment of the present disclosure includes a configuration for the soft start.

In the normal state, The BJT 33 controls the current of the photodiode (PD) according to the sense voltage (VCS) so as to perform a CC control. The operation in the normal state is equivalent to that of the previous exemplary embodiment.

In the open lamp state, the LED drive switch 60 is maintained at the turn-off state, and the sense voltage (VCS) is not generated. Therefore, in this instance, the output voltage (VOUT) is divided by the resistor R7 and the resistor R8, and the shunt regulator 31 is operated according to the control voltage (VC) occurring at the node (NR).

In the open lamp state, the output voltage (VOUT) can be controlled to be greater or less than the rated voltage according to a resistance ratio of the resistor R7 vs. the resistor R8. For example, as resistance of the resistor R8 becomes greater, the voltage at the node (NR) is increased so the output voltage (VOUT) for turning on the shunt regulator 31 is controlled to be a voltage that is less than the rated voltage. On the contrary, as resistance of the resistor R8 becomes less, the voltage at the node (NR) is reduced so the output voltage (VOUT) for turning on the shunt regulator 31 is controlled to be a voltage that is greater than the rated voltage.

Figure 7:
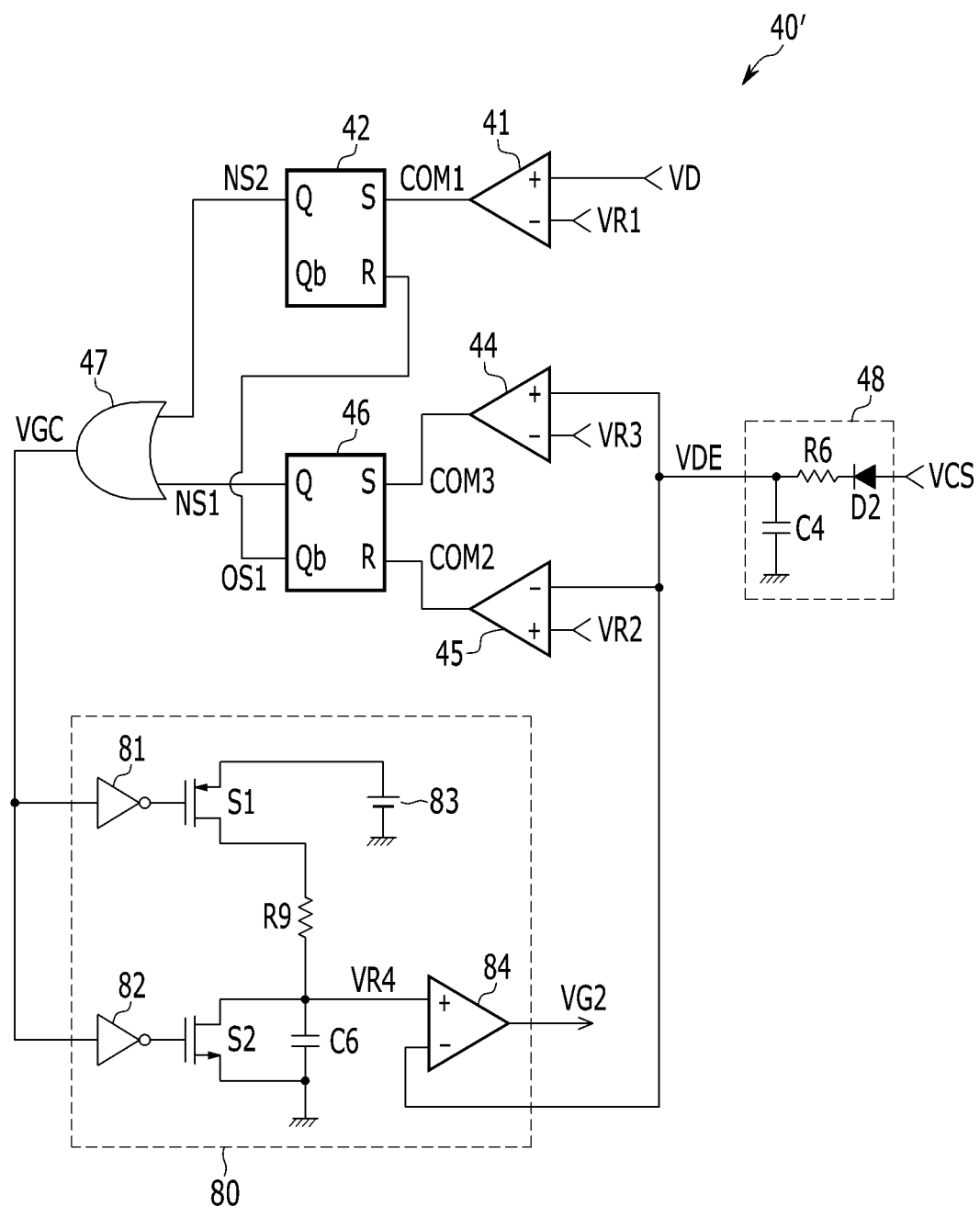
FIG. 7 shows an LED driver according to another exemplary embodiment of the present disclosure.

FIG. 7 shows an LED driver according to another exemplary embodiment of the present disclosure. As shown in FIG. 7, the LED driver 40' further includes a soft start controller 80, and it does not includes the AND gate for generating the open detection signal (CVS), compared to the LED driver 40 shown in FIG. 3.

The soft start controller 80 compares the detection voltage (VDE) with a soft reference voltage that is increased for a predetermined soft start period starting from a time when the open lamp state is changed to the normal state, and controls the LED drive switch 60. The current flowing to the LED drive switch 60 is increased and is then maintained by the CC control within the soft start period.

The soft start controller 80 senses the normal state or the open lamp state according to the gate control signal (VGC), and controls the soft start operation when the gate control signal (VGC) is changed to a level (i.e., enable level) for turning on the LED drive switch 60.

In detail, the soft reference voltage VR4 is increased during the soft start period starting from the time when the gate control signal (VGC) is changed to the enable level. When the soft start period is finished, the soft reference voltage VR4 is maintained at a voltage that is greater than the detection voltage (VDE).

When the normal state is changed to the open lamp state, the gate control signal (VGC) is changed to the level (i.e., disable level) for turning off the LED drive switch 60. The soft start controller 80 reduces the soft reference voltage VR4 to the zero voltage and the LED drive switch 60 is maintained to be turned off.

The soft start controller 80 includes a first inverter 81, a second inverter 82, a normal switch S1, an open lamp switch S2, a voltage source 83, a resistor R9, a capacitor C6, and a soft start comparator 84.

The first inverter 81 controls the normal switch S1 by using an inverted output of the gate control signal (VGC). The first inverter 81 includes an input terminal for receiving the gate control signal (VGC), and an output terminal connected to a gate electrode of the normal switch S1.

The second inverter 82 controls the open lamp switch S2 by using an inverted output of the gate control signal (VGC). The second inverter 82 includes an input terminal for receiving the gate control signal (VGC), and an output terminal connected to a gate electrode of the open lamp switch S2.

The normal switch S1 includes a source electrode connected to the voltage source 83, and the normal switch S1 includes a drain electrode connected to a first end of the capacitor C6 through the resistor R9. When the normal switch S1 is turned on, the capacitor C6 is charged by the voltage source 83. A charging current passing through the resistor R9 is generated by the voltage of the voltage source 83, and the capacitor C6 is charged by the charging current. The soft start period is determined by the voltage source 83, the resistor R9, and the capacitor C6.

For example, as the voltage of the voltage source 83 becomes greater, the current charging the capacitor C6 becomes greater to reduce the soft start period. Also, as resistance of the resistor R6 is reduced, the charging current becomes greater to reduce the soft start period. Further, as capacitance of the capacitor C6 becomes less, a voltage increase rate with respect to the charging charges becomes greater so the soft start period is short. The soft start period can be appropriately controlled by considering the above-noted point.

When the soft start period is finished in the normal state, the normal switch S1 is maintained in the turn-on state and the voltage charged in the capacitor C6 is maintained.

The open lamp switch S2 includes a source electrode connected to a first end of the capacitor C6, and a drain electrode connected to a second end of the capacitor C6 and the ground. When the open lamp switch S2 is turned on, the voltage charged in the capacitor C6 is grounded to become the zero voltage.

The voltage charged in the capacitor C6 is the soft reference voltage VR4 so the soft reference voltage VR4 is increased during the soft start period, it is then maintained, and it becomes the zero voltage in the open lamp state.

The soft start comparator 84 compares the soft reference voltage VR4 and the detection voltage (VDE), and controls the LED drive switch 60 during the soft start period according to the comparison result.

The soft start comparator 84 includes a non-inverting terminal (+) for receiving the soft reference voltage VR4, an inverting terminal (−) for receiving the detection voltage (VDE), and an output terminal connected to the gate electrode of the LED drive switch 60.

The soft start comparator 84 outputs a gate signal VG2 for turning on the LED drive switch 60 when the soft reference voltage VR4 is greater than the detection voltage (VDE), and it outputs a gate signal VG2 for turning off the LED drive switch 60 when the soft reference voltage VR4 is less than the detection voltage (VDE).

Connections and operations of the components of the LED driver 40' shown in FIG. 7 except those of the soft start controller 80 are equivalent to the exemplary embodiment that are described with reference to FIG. 3.

However, as described above, the open detection signal (CVS) does not need to be generated so the additional logic gate (AND gate in the above-described exemplary embodiment) is not included in the LED driver 40'.

Operations of a CC/CV driver and an LED driver according to another exemplary embodiment of the present disclosure will now be described with reference to FIG. 8 and FIG. 9.

Figure 8:
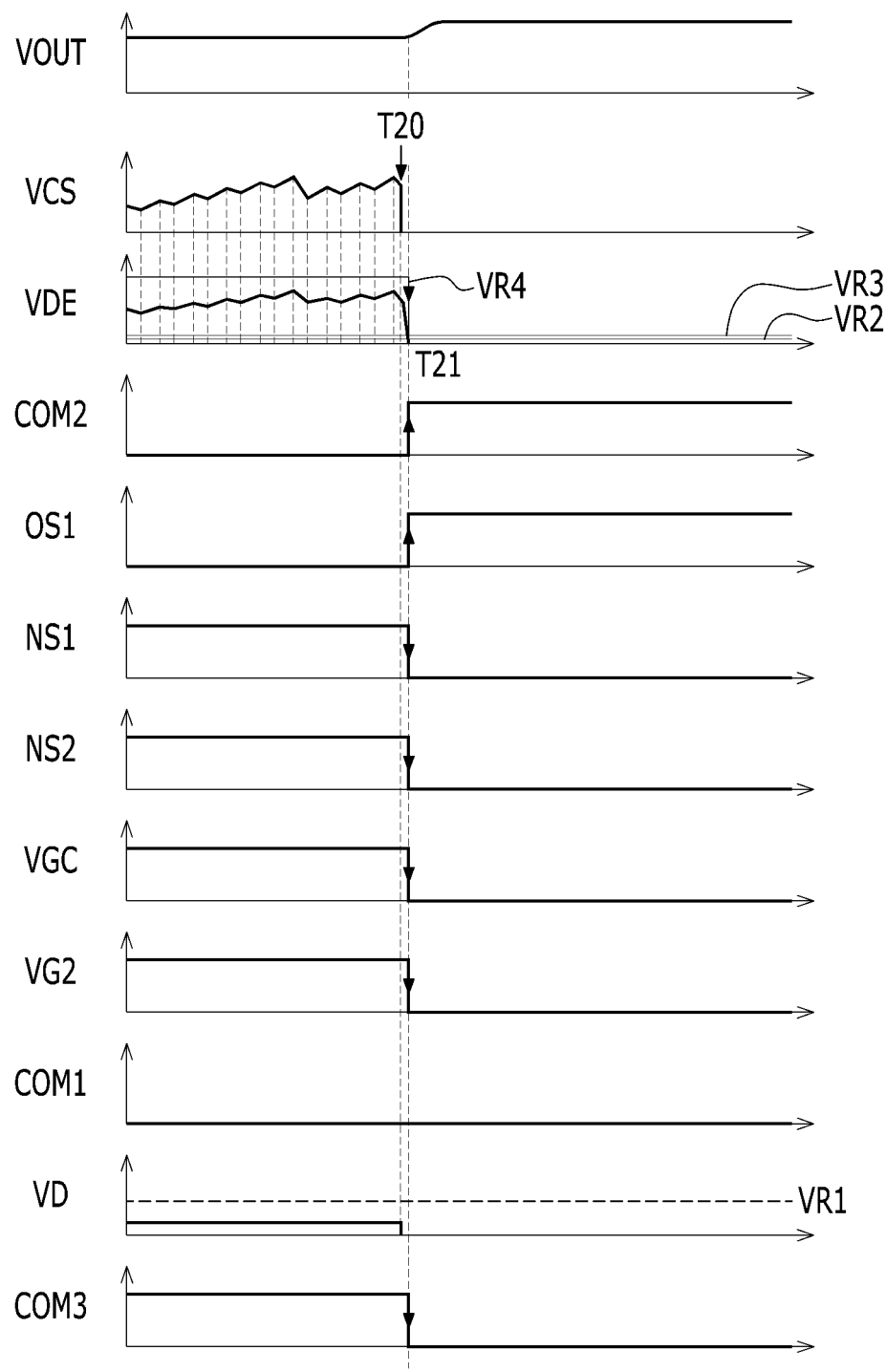
FIG. 8 shows a waveform diagram of signals of a CC/CV driver and an LED driver when a state is changed to an open lamp state from a normal state.

FIG. 8 shows a waveform diagram of signals of a CC/CV driver and an LED driver when a state is changed to an open lamp state from a normal state. The parts that are described with reference to FIG. 4 will be omitted.

The LED drive switch 60 is turned on in the normal state so the drain voltage (VD) is less than the normal reference voltage VR1 and the comparison signal COM1 is low. The detection voltage (VDE) is greater than the third threshold voltage VR3 so the comparison signal COM3 is high and the comparison signal COM2 is low.

The SR flip-flop 46 generates a high first normal detection signal NS1 and a low first open detection signal OS1, and the SR flip-flop 42 generates a low second normal detection signal NS2. An output by the OR gate 47 is a high gate control signal (VGC).

Therefore, the soft reference voltage VR4 is maintained in the normal state and the soft reference voltage VR4 is greater than the detection voltage (VFE) so the gate signal VG2 is maintained at the high level for turning on the LED drive switch 60.

When the open lamp state is generated at the time T20, the sense voltage (VCS) and the drain voltage (VD) become the zero voltages, and at the time T21, the detection voltage (VDE) becomes the zero voltage so the comparison signal COM3 becomes low and the comparison signal COM2 becomes high.

The SR flip-flop 46 generates a low first normal detection signal NS1 and a high first open detection signal OS1. The SR flip-flop 42 generates a low second normal detection signal NS2 by the high first open detection signal OS1.

The OR gate 47 generates a low gate control signal (VGC). The open lamp switch S2 is turned on and the capacitor C6 is grounded by the low gate control signal (VGC) so the soft reference voltage VR4 becomes the zero voltage. Therefore, since the detection voltage (VDE) is not less than the soft reference voltage VR4, the gate signal VG2 is reduced to the low level for turning off the LED drive switch 60.

The output current (IOUT) does not flow to the resistor (RS) so the CC/CV driver 30 starts the CV control. That is, the shunt regulator 31 is turned on by the output voltage (VOUT) and is controlled so that the output voltage (VOUT) may be constant.

After the time T21, the output voltage (VOUT) can be less than, equal to, or greater than the normal state. That is, the other exemplary embodiment of the present disclosure is not limited by the level of the output voltage (VOUT) in the open lamp state. However, the output voltage (VOUT) is maintained in the open lamp state. It will be assumed that the output voltage (VOUT) is maintained at a level that is greater than the normal state in FIG. 4.

Figure 9:
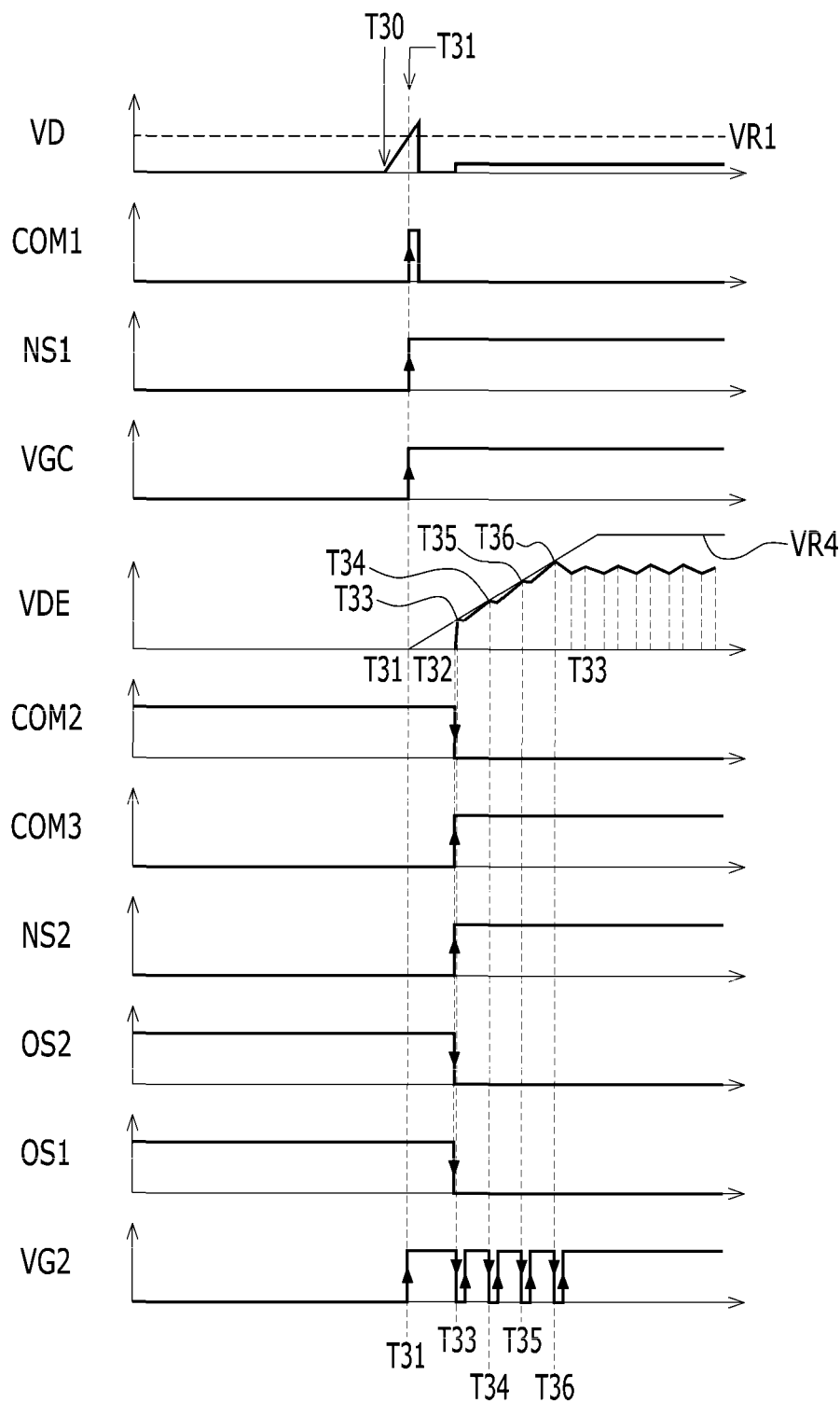
FIG. 9 shows a waveform diagram of signals of a CC/CV driver and an LED driver when a state is changed to a normal state from an open lamp state.

FIG. 9 shows a waveform diagram of signals of a CC/CV driver and an LED driver when a state is changed to a normal state from an open lamp state.

When the open lamp state is changed to the normal state at the time T30, the drain voltage (VD) rises by the output current (IOUT). The comparison signal COM1 rises in synchronization with the time T31 when the rising drain voltage (VD) reaches the normal reference voltage VR1.

The comparison signal COM1 becomes high so the SR flip-flop 42 generates a high second normal detection signal NS2, and the gate control signal (VGC) rises to reach the high level by the high second normal detection signal NS2.

At the time T31, the normal switch 51 is turned on and the open lamp switch S2 is turned off. At the time T31, the capacitor C6 begins being charged and the soft reference voltage VR4 rise. At the time T31, the detection voltage (VDE) is not yet generated so the fourth comparator 84 generates a high gate signal VG2.

The LED drive switch 60 is turned on, and at the time T32, the detection voltage (VDE) is generated. When the detection voltage (VDE) is generated, the comparison signal COM2 becomes low and the comparison signal COM3 becomes high. The SR flip-flop 46 generates a high first normal detection signal NS1 and a low first open detection signal OS1.

After the time T32, each time the detection voltage (VDE) reaches the rising soft reference voltage VR4 during the soft start period, the comparator 84 turns off the LED drive switch 60. When the LED drive switch 60 is turned off, the detection voltage (VDE) is reduced to be less than the soft reference voltage VR4 so the LED drive switch 60 is turned on.

As shown in FIG. 9, the gate signal VG2 has a pulse waveform in which the signal falls to the low level at each time T33, T34, T35, and T36 the detection voltage (VDE) reaches the soft reference voltage VR4, and it rises after the times T33, T34, T35, and T36.

In a like manner, the LED drive switch 60 performs a switching operation during the soft start period, and the current flowing to the LED drive switch 60 rises along the soft reference voltage VR4.

After the time T36, the peak of the current flowing to the LED drive switch 60 is constantly controlled by the CC control. From the time T36, the soft reference voltage VR4 is always greater than the detection voltage (VDE), so the gate signal VG2 is maintained at the high level.

The other exemplary embodiment of the present disclosure is not restricted to the output voltage (VOUT) in the open lamp state, and it follows the soft start while the output current (IOUT) rises to reach a predetermined level after the open lamp state is changed to the normal state.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A device for emitting an LED, comprising:
   an LED string including a plurality of LEDs;
   an LED drive switch including a first end connected to a first end of the LED string;
   an LED driver for controlling an output current that is supplied to the LED string by controlling the LED drive switch; and
   a constant current/constant voltage driver for generating feedback information on an output voltage supplied to the LED string or the output current, wherein the LED driver uses the output current to sense an open lamp state of the LED string, and uses a voltage at the first end of the LED drive switch to sense a change of the LED string to a normal state from the open lamp state,
   wherein the LED driver senses a change to the normal state from the open lamp state according to a result of comparing the voltage at the first end of the LED drive switch and a normal reference voltage.

2. The device of claim 1, wherein the LED emitting device further includes a sense resistor connected between a second end of the LED drive switch and a ground; and
   the LED driver uses a sense voltage that is generated when the output current flows to the sense resistor to sense the open lamp state of the LED string.

3. The device of claim 2, wherein the LED driver senses the open lamp state according to a result of comparing a detection voltage that is increased or decreased by the sense voltage and an open sense voltage.

4. The device of claim 3, wherein the LED driver includes:
   a first comparator for outputting the result of comparing the voltage at the first end of the LED drive switch and the normal reference voltage;
   a second comparator for outputting the result of comparing the detection voltage and the open sense voltage;
   a third comparator for outputting a result of comparing the detection voltage and a reference voltage that is greater than the open sense voltage;
   a first SR flip-flop for generating a first normal detection signal for indicating a normal state according to an output of the second comparator that is input to a set terminal, and generating a first open detection signal for indicating an open lamp state according to an output of the third comparator that is input to a reset terminal;
   a second SR flip-flop for generating a second normal detection signal for indicating a normal state according to an output of the first comparator that is input to a set terminal, and generating a second open detection signal according to the first open detection signal that is input to a reset terminal;
   a first logic gate for turning on the LED drive switch when at least one of the first normal detection signal and the second normal detection signal shows the normal state; and
   a second logic gate for outputting an open detection signal to the constant current/constant voltage driver when both the first open detection signal and the second open detection signal show the open lamp state.

5. The device of claim 1, wherein the constant current/constant voltage driver generates feedback information following the output current so as to perform a constant current control on the output current in the normal state, and the constant current/constant voltage driver generates feedback information following the output voltage so as to perform a constant voltage control on the output voltage in the open lamp state.

6. The device of claim 5, wherein the constant current/constant voltage driver includes:
   a shunt regulator including a reference terminal, a grounded output terminal, and an input terminal for receiving the output voltage, the shunt regulator being turned on when a voltage that is input to the reference terminal is greater than a reference voltage;
   a photodiode connected between the input terminal of the shunt regulator and the output voltage;
   a first resistor connected between an anode of the photodiode and the output voltage; and
   a constant current/constant voltage controller using the sense voltage to control a current of the photodiode so as to perform a constant current control in the normal state, and using the output voltage to generate a control voltage so as to perform a constant voltage control in the open lamp state, wherein the control voltage is input to the reference terminal of the shunt regulator.

7. The device of claim 6, wherein the constant current/constant voltage controller receives an open detection signal for indicating the open lamp state from the LED driver, and controls the output voltage with a voltage that is less than a rated voltage during the open lamp state.

8. The device of claim 7, wherein the constant current/constant voltage controller includes:
   a second resistor connected between a first end connected to the output voltage and the reference terminal of the shunt regulator;
   a capacitor and a third resistor connected in series between the reference terminal and the input terminal;
   a fourth resistor and a fifth resistor connected in series between the reference terminal and the ground;
   a switch connected in parallel to the fifth resistor, and turned on in the normal state and turned off in the open lamp state; and
   a BJT including a collector connected to the input terminal, a grounded emitter, and a base to which the sense voltage is transmitted.

9. The device of claim 8, wherein the LED driver includes:
   a first comparator for outputting the result of comparing the voltage at the first end of the LED drive switch and the normal reference voltage;
   a second comparator for outputting the result of comparing the detection voltage and the open sense voltage;
   a third comparator for outputting a result of comparing the detection voltage and a reference voltage that is greater than the open sense voltage;
   a first SR flip-flop for generating a first normal detection signal for indicating a normal state according to an output of the second comparator that is input to a set terminal, and generating a first open detection signal for indicating an open lamp state according to an output of the third comparator that is input to a reset terminal;
   a second SR flip-flop for generating a second normal detection signal for indicating a normal state according to an output of the first comparator that is input to a set terminal, and generating a second open detection signal according to the first open detection signal that is input to a reset terminal;
   a first logic gate for turning on the LED drive switch when at least one of the first normal detection signal and the second normal detection signal shows the normal state; and
   a second logic gate for outputting an open detection signal to the constant current/constant voltage driver when both the first open detection signal and the second open detection signal show the open lamp state.

10. The device of claim 9, wherein the switch performs a switching operation according to the open detection signal.

11. The device of claim 3, wherein the LED driver rectifies the sense voltage to generate the detection voltage that is greater than the open sense voltage in the normal state.

12. The device of claim 11, wherein the LED driver includes:
   a diode including an anode for receiving the sense voltage;
   a resistor including a first end connected to a cathode of the diode; and
   a capacitor including a first end connected to a second end of the resistor, wherein the detection voltage represents a voltage that is charged in the capacitor.

13. The device of claim 2, wherein the LED driver senses the open lamp state according to a result of comparing a detection voltage that is increased or decreased according to the sense voltage and an open sense voltage, senses a change to the normal state from the open lamp state according to a result of comparing a voltage at a first end of the LED drive switch and a normal reference voltage, generates a soft reference voltage that is increased for a predetermined soft start period from a time when the change to the normal state is sensed, and controls the LED drive switch by using the soft reference voltage.

14. The device of claim 13, wherein the LED driver includes:
- a first comparator for outputting the result of comparing the voltage at the first end of the LED drive switch and the normal reference voltage;
- a second comparator for outputting the result of comparing the detection voltage and the open sense voltage;
- a third comparator for outputting a result of comparing the detection voltage and a reference voltage that is greater than the open sense voltage;
- a first SR flip-flop for generating a first normal detection signal for indicating a normal state according to an output of the second comparator that is input to a set terminal, and generating a first open detection signal for indicating an open lamp state according to an output of the third comparator that is input to a reset terminal;
- a second SR flip-flop for generating a second normal detection signal for indicating a normal state according to an output of the first comparator that is input to a set terminal;
- a first logic gate for generating a gate control signal for controlling turn-on of the LED drive switch when at least one of the first normal detection signal and the second normal detection signal indicates the normal state; and
- a soft start controller for generating the soft reference voltage that is increased for the soft start period according to the gate control signal, and controlling the LED drive switch according to a result of comparing the detection voltage and the soft start reference voltage.

15. The device of claim 14, wherein the soft start controller includes:
- a voltage source;
- a normal switch including a first end connected to the voltage source, and performing a switching operation according to the gate control signal;
- an open lamp switch for performing a switching operation according to the gate control signal;
- a capacitor connected in parallel to the open lamp switch;
- a resistor connected between the capacitor and a second end of the normal switch; and
- a comparator for controlling the LED drive switch according to a result of comparing a voltage at a node of the resistor and the capacitor and the detection voltage; and
- the voltage at the node of the resistor and the capacitor is the soft reference voltage.

16. The device of claim 13, wherein the constant current/constant voltage driver generates feedback information following the output current so as to perform a constant current control on the output current in the normal state, and it generates feedback information following the output voltage so as to perform a constant voltage control on the output voltage in the open lamp state.

17. The device of claim 16, wherein the constant current/constant voltage driver includes:
- a shunt regulator including a reference terminal, a grounded output terminal, and an input terminal for receiving the output voltage, the shunt regulator being turned on when a voltage that is input to the reference terminal is greater than a reference voltage;
- a photodiode connected between the input terminal of the shunt regulator and the output voltage;
- a first resistor connected between an anode of the photodiode and the output voltage; and
- a constant current/constant voltage controller using the sense voltage to control a current of the photodiode so as to perform a constant current control in the normal state, and using the output voltage to generate a control voltage so as to perform a constant voltage control in the open lamp state, wherein the control voltage is input to the reference terminal of the shunt regulator.

18. The device of claim 17, wherein the constant current/constant voltage controller includes:
- a second resistor connected between a first end connected to the output voltage and the reference terminal of the shunt regulator;
- a capacitor and a third resistor connected in series between the reference terminal and the input terminal;
- a fourth resistor connected in series between the reference terminal and the ground; and
- a BJT including a collector connected to the input terminal, a grounded emitter, and a base to which the sense voltage is transmitted.

19. A method for driving an LED emitting device including an LED string for emitting light according to output current and a LED drive switch connected to the LED string, and generating an output voltage that is supplied to the LED string, comprising:
- sensing an open lamp state by sensing the output current;
- performing a constant voltage control on the output voltage in the open lamp state;
- sensing a change to the normal state from the open lamp state according to a result of comparing a voltage at a first end of the LED drive switch and a predetermined normal reference voltage;
- turning on the LED drive switch when a voltage of the LED drive switch reaches the predetermined normal reference voltage; and
- performing a constant current control on the output current when the LED drive switch is turned on.

20. A method for driving an LED emitting device including an LED string for emitting light according to output current and a LED drive switch connected to the LED string, and generating an output voltage that is supplied to the LED string, comprising:
- sensing an open lamp state by sensing the output current;
- performing a constant voltage control on the output voltage in the open lamp state;
- turning on the LED drive switch when a voltage of the LED drive switch reaches a predetermined normal reference voltage;
- generating a reference voltage from a soft start controller in an LED driver, the LED driver controlling the LED drive switch; and
- switching the LED drive switch according to a result of comparing the reference voltage and a detection voltage following the output current, the reference voltage being increased for a predetermined soft start period from a time when the LED drive switch is turned on.

* * * * *